United States Patent [19]

Itoh et al.

[11] Patent Number: 5,100,954
[45] Date of Patent: Mar. 31, 1992

[54] SOILRESISTING AGENT COPOLYMER OF FLUORINATED, UNSATURATED URETHANE AND UNSATURATED MONOMER

[75] Inventors: Katsuji Itoh; Gen-ichirou En-na, both of Yokohama; Sachio Otoshi, Zushi, all of Japan

[73] Assignee: Asahi Glass Company Ltd., Tokyo, Japan

[21] Appl. No.: 567,646

[22] Filed: Aug. 15, 1990

[30] Foreign Application Priority Data

Aug. 17, 1989 [JP] Japan .................................. 1-210700

[51] Int. Cl.$^5$ .............................................. C08K 5/16
[52] U.S. Cl. ................................... 524/805; 524/457; 525/455; 526/248
[58] Field of Search ............... 524/457, 805; 525/455; 526/248

[56] References Cited

U.S. PATENT DOCUMENTS

| | | | |
|---|---|---|---|
| 3,398,182 | 8/1968 | Guenthner | 558/239 |
| 4,340,749 | 7/1982 | Patel | 560/182 |
| 4,373,053 | 2/1983 | Sato et al. | 524/457 |

FOREIGN PATENT DOCUMENTS 0103752  8/1983  Fed. Rep. of Germany .
3727665  3/1989  Fed. Rep. of Germany .

OTHER PUBLICATIONS

Derwent Accession No. 87-133 110, Questel Tele-systems (WPIL) Derwent Publications Ltd., London *Abstract* & JP-A-63-073 944.
Derwent Accession No. 88-334 932, Questel Telesystems (WPIL) Derwent Publications Ltd., London *Abstract* & JP-A-63-248 833.

*Primary Examiner*—Maurice J. Welsh
*Assistant Examiner*—Rachel Johnson
*Attorney, Agent, or Firm*—Oblon, Spivak, McClelland, Maier & Neustadt

[57] ABSTRACT

A soilresisting agent containing, as an effective component, a copolymer of (I) a fluorine-containing urethane compound containing a (meth)acryloyl group or an allyl group, and a polyfluoroalkyl group, obtained by reacting (a) a polyfunctional isocyanate having at least trifunctionality, (b) a hydroxy compound containing a (meth)acryloyl group or an allyl group, and (c) a hydroxy compound having a polyfluoroalkyl group, and (II) a copolymerizable compound other than said fluorine-containing urethane compound.

10 Claims, No Drawings

SOILRESISTING AGENT COPOLYMER OF FLUORINATED, UNSATURATED URETHANE AND UNSATURATED MONOMER

The present invention relates to a soilresisting agent particularly effective for imparting water and oil repellency and dry soil resistance to carpets or cloth made of synthetic organic polymers.

In the production of carpets on an industrial scale, it is common to treat the fibers of the carpets with a composition to impart desired properties to the carpets, such as oil and water repellency and resistance against stains such as particulate or dry soil stains.

Heretofore, perfluoroalkyl group-containing urethane compounds (Japanese Unexamined Patent Publications No. 4000/1979 and No. 33315/1984) and ester compounds (U.S. Pat. No. 3,398,182 and Japanese Unexamined Patent Publication No. 10539/1983) have been proposed to meet the above object. However, these compounds do not present practically adequate properties. Further, as an agent capable of imparting a high level of such properties, a mixture comprising a urethane compound containing a perfluoroalkyl group and a polymer which does not contain a non-vinylfluorine as a copolymer component, has been proposed (U.S. Pat. No. 3,916,053 or 4,043,964). This composition has a desirable characteristic such that it is capable of imparting durable soilresisting properties to carpets. However, since it is a mixture of different latexes, it has a drawback that the mechanical stability is inadequate so that precipitates are likely to form during the storage after mixing.

It is an object of the present invention to overcome such practical drawbacks that the soilresisting properties are inadequate, and the stability is low.

The present inventors have conducted extensive researches in view of the problems of the conventional techniques and as a result, have found that a copolymer latex comprising a fluorine-containing urethane compound containing a (meth)acryloyl group (i.e. a methacryloyl group and/or an acryloyl group) or an allyl group, and a polyfluoroalkyl group, and a copolymerizable compound other than this fluorine-containing urethane compound, is capable of imparting excellent soilresisting properties to fiber products. The present invention has been accomplished on the basis of this discovery.

Thus, the present invention provides a soilresisting agent containing, as an effective component, a copolymer of (I) a fluorine-containing urethane compound containing a (meth)acryloyl group or an allyl group, and a polyfluoroalkyl group, obtained by reacting (a) a polyfunctional isocyanate having at least trifunctionality, (b) a hydroxy compound containing a (meth)acryloyl group or an allyl group, and (c) a hydroxy compound having a polyfluoroalkyl group, and (II) a copolymerizable compound other than said fluorine-containing urethane compound.

Now, the present invention will be described in detail with reference to the preferred embodiments.

In the present invention, the fluorine-containing urethane compound containing a (meth)acryloyl group or an allyl group, and a polyfluoroalkyl group, is the one obtainable by reacting a polyfunctional isocyanate compound having at least trifunctionality, a hydroxy compound containing a (meth)acryloyl group or an allyl group, and a hydroxy compound containing a polyfluoroalkyl group. In order to control the formation of a urethane compound which does not contain a polyfluoroalkyl group, it is preferred to firstly react the hydroxy compound containing a polyfluoroalkyl group with the polyfunctional isocyanate compound and then react the reaction product with the hydroxy compound containing a (meth)acryloyl group or an allyl group.

The molar ratio for the reaction of the polyisocyanate compound, the hydroxy compound containing a (meth)acryloyl group or an allyl group, and the hydroxy compound containing a polyfluoroalkyl group, is preferably such that the molar ratio of the hydroxy compound containing a (meth)acryloyl group or an allyl group, and the hydroxy compound containing a polyfluoroalkyl group to 3 mol of the isocyanate group is from 1:2 to 2.8:0.2.

The polyfunctional isocyanate compound in the present invention may be a bifunctional isocyanate compound as shown below, but is preferably at least trifunctional from the view point of the soilresisting properties. The bifunctional isocyanatate compound includes, for example, an aromatic isocyanate such as 2,4-tolylene diisocyanate, 4,4'-diphenylmethane diisocyanate, tolidine diisocyanate or dianisidine diisocyanate, an alicyclic diisocyanate such as 2-methyl-cyclohexane 1,4-diisocyanate, isophorone diisocyanate or hydrogenated MDI

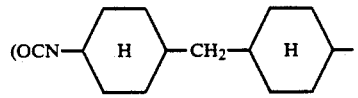

NCO), and an aliphatic isocyanate such as hexamethylene diisocyanate or decamethylene diisocyanate. If these isocyanates are represented by the general formula OCN-Y-NCO, and if OCN-Y-NCO is reacted by itself in the presence of water, a dimer of the formula OCN-Y-NHCONH-Y-NCO will be formed. The bifunctional isocyanate compound includes such a dimer. A polyfunctional isocyanate such as a trifunctional, tetrafunctional or pentafunctional isocyanate is more preferred than a bifunctional isocyanate from the viewpoint of the soilresisting properties and the durability thereof. Further, two or more isocyanate compounds having different polyfunctionalities may be used in combination. Specific examples of a trifunctional isocyanate compound include the following compounds. As mentioned above, however, the trifunctional isocyanate compound further includes compounds having tri-NCO groups such as a trimer of the formula

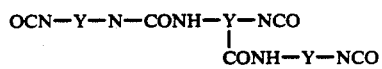

obtainable by the reaction of a monomer of the formula OCN-Y-NCO with a dimer of the formula OCN-Y-NHCONH-Y-NCO, and a tetramer of the formula

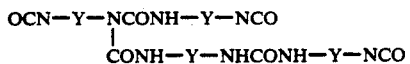

obtainable by the reaction of two molecules of such a dimer.

Specific examples of such a trifunctional isocyanate compound include the following compounds:

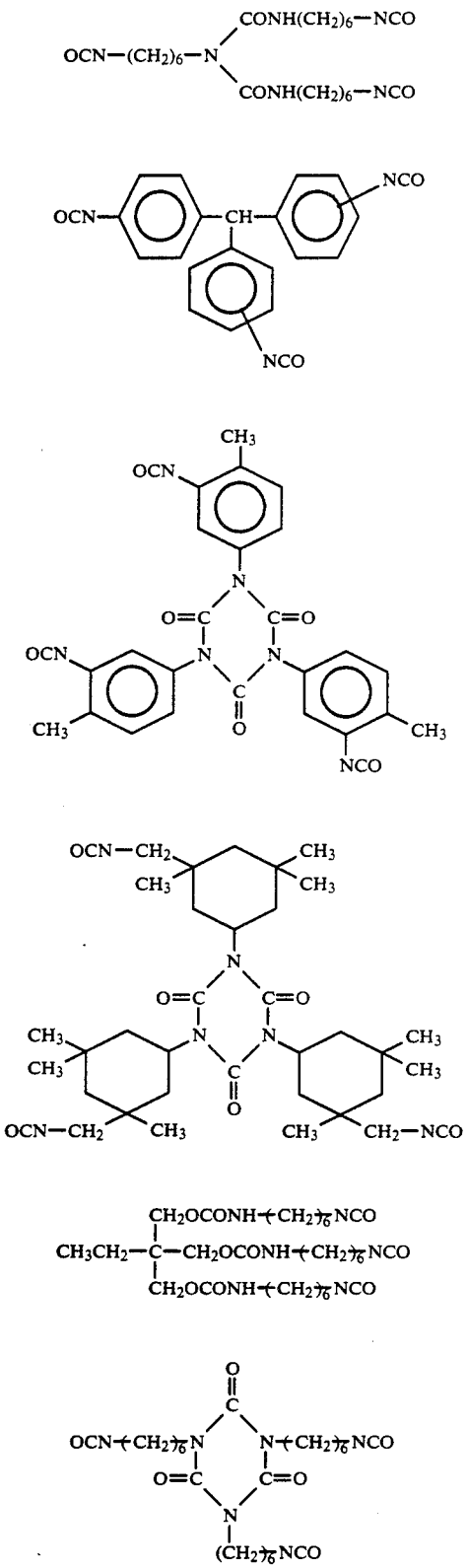

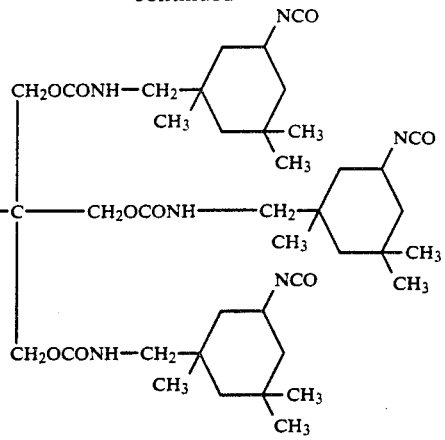

However, the trifunctional isocyanate compound useful for the present invention is not limited to the above mentioned specific examples.

From the viewpoint of the application to carpets or cloth, aliphatic isocyanates are preferred to avoid yellowing by the use.

The hydroxy compound having a (meth)acryloyl group or an allyl group includes the following compounds as suitable examples:

$$CH_2=CR^1COOCH_2CH_2OH$$

$$CH_2=CR^1COOCH_2\underset{OH}{\underset{|}{C}H}CH_3$$

$CH_2=CR^1COOCH_2CH_2CH_2OH$ $CH_2=CR^1COO(C_2H_4O)_pH$ (p is an integer of from 1 to 12)

$CH_2=CR^1COO(C_3H_6O)_pH$ (p is an integer of from 1 to 12)

$CH_2=CHCH_2O(C_2H_4O)_pH$ (p is an integer of from 1 to 12) (wherein $R^1$ is H or $CH_3$)

The above compounds may be used in combination.

The hydroxy compound containing a polyfluoroalkyl group includes the following compounds as suitable examples:

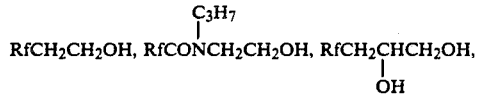

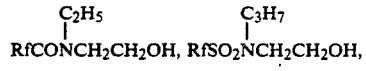

Two or more different kinds of these compounds may be used in combination. Further, two or more compounds having different carbon numbers for Rf may be used in combination.

The above Rf is a linear or branched polyfluoroalkyl group having from 1 to 20 carbon atoms, preferably from 4 to 16 carbon atoms. It is common to select a compound having a perfluoroalkyl group at its terminal. However, it is possible to employ the one having a hydrogen atom or a chlorine atom at the terminal or the one having an oxyperfluoroalkylene-containing group. A preferred embodiment of Rf is a perfluoroalkyl group of the formula $C_nF_{2n+1}$ wherein n is an integer of from 4 to 16. Particularly preferred is the one wherein n is from 6 to 12.

The compound copolymerizable with the fluorine-containing urethane compound synthesized from these starting materials, is a copolymer compound other than the fluorine-containing urethane compound, as follows. Namely, it may be methacrylic acid, acrylic acid or esters thereof, such as:

$CH_2=CR^1COOR^2$, $CH_2=CR^1COOCH_2CH_2Rf$,
$CH_2=CR^1COO(CH_2CH_2O)_pH$ (p is an integer of from 1 to 12),

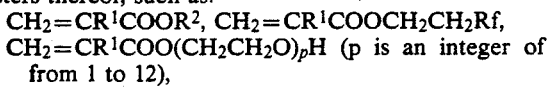

(wherein $R^1$ is H or $CH_3$, $R^2$ is H or $C_qH_{2q+1}$ wherein q is an integer of from 1 to 23, preferably from 1 to 6), or $CH_2=CR^1CHNHCH_2OH$, $CH_2=CR^1CONHC-H_2OC_4H_9$, $CH_2=CHCl$,
$CH_2=CCl_2$, $CH_2=CHOCOCH_3$,
$CH_2=CHCH_2OH$,

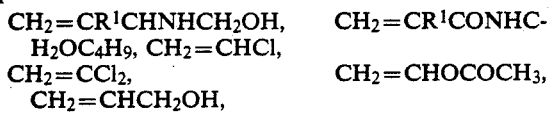

(wherein $R^1$ is H or $CH_3$).

These copolymer compounds may be used in combination as a mixture of two or more different types.

In order to control the formation of a homopolymer of the fluorine-containing urethane compound, the copolymerizable compound other than the fluorine-containing urethane compound, is preferably a nonfluorine copolymer compound containing a (meth)acryloyl group or a vinyl group.

To obtain a copolymer of the fluorine-containing urethane compound and the copolymerizable compound other than this fluorine-containing urethane compound, various polymerization methods including bulk polymerization, solution polymerization, suspension polymerization and emulsion polymerization, may be employed. Further, as a manner for initiating the polymerization, various polymerization initiating methods including the polymerization by means of an initiator, the radiation polymerization and photo polymerization, may be employed. However, in the solution polymerization, the product tends to be geled and insolubilized, and as such will be hardly useful as a soilresisting agent. Therefore, the following suspension polymerization is preferred. Namely, the fluorine-containing urethane compound and the copolymerizable compound other than this fluorine-containing urethane compound are dissolved in a water-insoluble organic solvent, then the solution is emulsified and dispersed in water, followed by polymerization. After the polymerization, the solvent is distilled off to obtain an aqueous dispersion type soilresisting agent composed of the copolymer of the present invention. The soilresisting agent of the present invention is useful in the form of an organic solution or an organic dispersion. However, from the viewpoint of the application to a dyeing process or the influence to the working environment for the soilresisting treatment, an aqueous dispersion type is particularly preferred. Various types of surfactant such as nonionic, anionic, cationic and amphoteric surfactants may be used as dispersing agents for aqueous dispersions. Such surfactants may be used suitably in combination. Specifically, nonionic surfactants such as a polyoxyethylene monooleyl ether, a polyoxyethylene monoalkyl ether, a polyoxyethylene mono(alkylphenyl) ether, a polyoxyethylene monooleate, a polyoxyethylene monoalkylcarboxylate, a sorbitan ester and sucrose ester, cationic surfactants such as a quaternary ammonium salt and an acetate of a tertiary amine, anionic surfactants such as a sodium alkylsulfonate, an alkylcarboxylic acid and its salt, and a sodium alkoxypolyoxyethylene sulfonate, and amphoteric surfactants of betaine type or phosphate type such as choline or ethanol amine, are preferred.

The presence of a water-insoluble solvent facilitates the emulsification and at the same time facilitates the copolymerization reaction of the fluorine containing urethane compound containing a methacryloyl group, an acryloyl group or an allyl group as well as a polyfluoroalkyl group, and the copolymerizable compound other than this fluorine-containing urethane compound. As such a solvent, any solvent may be used without any particular restriction so long as it is insoluble in water and capable of dissolving both the above mentioned fluorine-containing urethane compound and the copolymerizable compound other than the fluorine-containing urethane compound. A ketone such as methyl ethyl ketone, methyl isopropyl ketone or methyl isobutyl ketone, an ester such as methyl acetate, ethyl acetate or butyl acetate or a hydrocarbon such as benzene, toluene, xylene, hexane or cyclohexane may be mentioned as preferred examples. Such an organic solvent is added usually in an amount of from 10 to 300 parts by weight, preferably from 20 to 200 parts, per 100 parts by weight of the copolymer of the present invention.

When the soilresisting agent of the present invention is made into an aqueous dispersion type, the solid content concentration of the copolymer of the present invention is not particularly limited, but is usually from 5 to 60% by weight, preferably from 5 to 50% by weight. At the time of treatment, this aqueous dispersion is diluted with water to a concentration of from 0.2 to 4% by weight for application. Such an aqueous dispersion type soilresisting agent has advantageous over an organic solvent type in that the flash point of the stock solution is high, and the solid content concentration can be made high, and has various other advantageous such that the pollution of the working environment by the treatment can be minimized.

As the initiator for polymerization, it is preferred to employ an oil-soluble initiator among azo initiators and peroxide initiators. For example, the following compounds may be mentioned as preferred initiators:

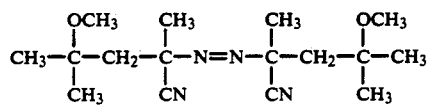

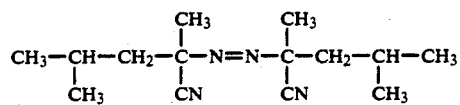

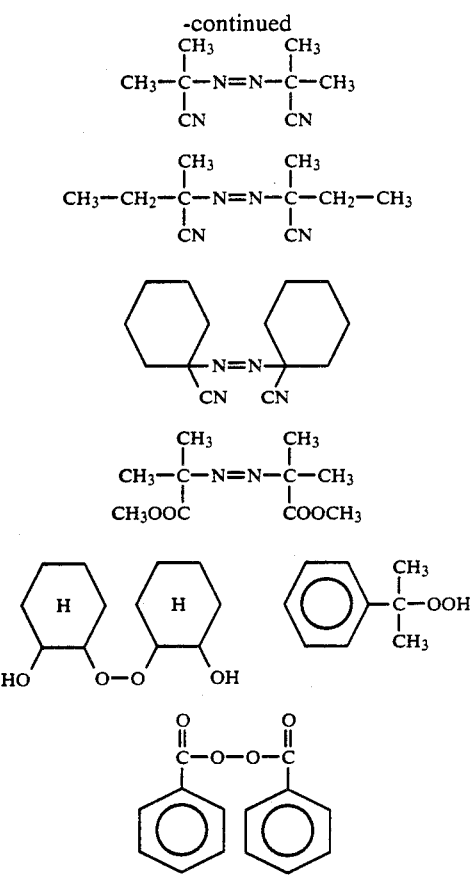

The polymerization temperature may be selected depending upon the initiator, but is usually preferably from 40° to 80° C.

The fluorine content in the copolymer of the present invention is usually from 2 to 50% by weight, preferably from 8 to 30% by weight. Too much the amount or too small the amount is not desirable from the viewpoint of the soilresisting properties.

There is no particular restriction as to the articles to be treated by the soilresisting agent of the present invention. Various examples may be mentioned, including fiber products, glass, paper, wood, leather, far, asbestos, bricks, cement, ceramics, metals and oxides, porcelains, plastics, coated surfaces and plasters. The fiber fabrics may be made of animal or plant natural fibers such as cotton, hemp, wool or silk, various synthetic fibers such as polyamide, polyester, polyvinyl alcohol, polyacrylonitrile, polyvinyl chloride or polypropylene, semi synthetic fibers such as rayon or acetate, inorganic fibers such as glass fibers, carbon fibers or asbestos fibers, or blends of these fibers. Particularly, fiber products using polyamide fibers (nylon) tufted fine denier and interior products such as carpets, reception room sets, drapes, wall papers or interior decorations of cars, may be mentioned as preferred objects to be treated.

Leather products include, for example, leather products of cases or bags or leather products of clothings as well as shoes. Further, for leather groves (particularly for golfing and skiing), the water and oil repellency and its durability present excellent effects for the particular purpose of use.

By treating leather products with the soilresisting agent of the present invention, it is possible to impart water and oil repellency having a high level of durability which has not been attained with conventional water and oil repellents, because the soilresisting agent of the present invention has urethane bonds and thus is excellent in the adhesion to the leather products and in the durability against abrasion. At the same time, it is a polymer and thus has excellent film-forming properties and is excellent in the durability against e.g. washing or dry cleaning.

With conventional treating agents, it has been impossible to adequately satisfy such two properties. An urethane oligomer containing a perfluoroalkyl group as a conventional treating agent, provides satisfactory adhesion to leathers and satisfactory durability against abrasion, but such a urethane compound itself is poor in the film forming properties and thus has a weak point that it is inferior in the durability against washing or dry cleaning. On the other hand, a fluorine-containing polymer having a perfluoroalkylacrylate copolymerized thereto, has good film-forming properties and is durable against e.g. washing, but it has a problem that its adhesion to leathers is weak, and it is likely to fall off by abrasion.

Whereas, the soilresisting agent of the present invention is a vinyl polymer having perfluoroalkyl groups and urethane bonds as side chains, whereby the side chain portions of the polymer provide excellent adhesion and water and oil repellency, while the backbone portion of the polymer provides film-forming properties, whereby it is possible to impart excellent durability to leather products.

There is no particular restriction as to the method for application of the soilresisting agent of the present invention, and various known or well known methods may be employed. For example, it may be applied by a method wherein it is deposited or absorbed on the surface of an article to be treated by a conventional method for coating treatment such as dipping, spraying or coating, followed by drying. Further, at the time of application, various treating agents or additives such as an antistatic agent, an insecticide, a flame retardant, a dye stabilizer and a crease preventing agent, may be used in combination.

Further, in recent years, a dye stain preventing agent (such as Stain Blocker, trade name of Monsant Company, or Stain Master, trade mark of Dupont Company) is widely used in Europe and the United States as a treating agent for carpets for the purpose of preventing the stain of carpets with dyes such as food additives contained in soft drinks such as Cool Aides. For the purpose of imparting dry soil resistance and water and oil repellency to the carpets already treated by such a dye stain preventing agent, it is possible to apply a soilresisting agent of the present invention to the carpets already treated for the dye stain preventing properties, or to apply the soilresisting agent of the present invention simultaneously at the time of treating with the dye stain preventing agent, whereby it is possible to impart excellent soilresisting properties such as water and oil repellency and dry soil resistance to fiber products, etc.

According to the present invention, a latex having high stability and high soilresisting properties as compared with the conventional products can be obtained. The latex of the present invention is believed to have such high stability, since it is in the form of uniform fine spherical particles. When applied to carpets, etc., the soilresisting agent of the present invention provides high water and oil repellency and high dry soil resistance simultaneously. This is believed attributable to the copolymer structure of the present invention, whereby the Rf-containing urethane moiety performing water and oil repellency and the vinyl polymer moiety performing dry soil resistance are organically connected and yet are capable of performing their functions independently.

Now, the the present invention will be described in further detail with reference to Examples. However, it should by understood that the present invention is by no means restricted to such specific Examples.

In the following Examples "parts" means "parts by weight" unless otherwise specified.

REFERENCE EXAMPLE 1

Into a 1 l three-necked flask equipped with a stirrer, 100 parts of hexamethylene diisocyanate trisburet:

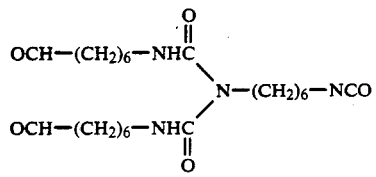

and 374 parts of methyl isobutyl ketone were introduced, and while stirring the mixture at 200 rpm, nitrogen gas was blown thereinto to remove the water content. The mixture was heated to 60° C., and 0.1 part of dibutyltin dilaurate was added as a catalyst. Then, 213.8 parts of a perfluoroalkylethyl alcohol ($C_nF_{2n+1}CH_2CH_2OH$, a mixture of n=6, 8, 10, 12 and 14, n≈9) (hereinafter referred to simply as a Rf alcohol) was dropwise added over a period of two hours. Then, 91.7 parts of a polyoxyethylenemono(methacryloyl) ester ($CH_2=C(CH_3)COO(CH_2CH_2O)_nH$, a mixture of n=1 to 12, n≈8) was dropwise added over a period of 30 minutes. The reaction was continued under the same condition for further 4 hours to complete the reaction. By IR, it was confirmed that the peak of isocyanate disappeared. By NMR, it was confirmed that a urethane compound composed solely of the Rf alcohol and the isocyanate was no longer detected.

REFERENCE EXAMPLES 2 to 10

In the same manner as in Reference Example 1, the compounds identified in Tables 3 and 4 were reacted.

COMPARATIVE REFERENCE EXAMPLE

The compounds identified in Table 5 were reacted in the same manner as in Reference Example 1 except that diisocyanate was used instead of the polyisocyanate.

EXAMPLE 1

To 150 parts of a mixture comprising 100 parts (solid content: 50 parts, MIBK: 50 parts) of the urethane compound of Reference Example 1 and 50 parts of methyl methacrylate (MMA), 1.5 parts of polyoxyethylenenonylphenyl ether (Emulgen 920, manufactured by Kao Corporation) as an emulsifier and 5.0 parts of N,N-dimethylstearylamine acetate (Armine DM18D Acetate, manufactured by Lion Corporation) were added, and then heated to 50° C. and dissolved. Then, while stirring the mixture by a homomixer (manufactured by Tokushukika K. K.), 200 parts of warm water of 50° C. was added. Further, the mixture was treated by a high pressure homogenizer. Into an ample for polymerization, 100 parts of this emulsion and 0.2 part of azoisobutyronitrile as a polymerization initiator were added and reacted in an autoclave at 60° C. for 20 hours. The conversion of the monomer was substantially 100%. After the polymerization reaction, MIBK was distilled off under reduced pressure to obtain a milky white stable latex. By the observation by an electron microscope, it was confirmed that the latex was composed of uniform spherical particles having a particle size of 0.2 μm. To confirm that there were no homopolymer of the urethane compound and no homopolymer of MMA, the latex was dispersed in methanol for precipitation, the solid content was recovered, and the solvent extraction was conducted by benzene and methyl ethyl ketone, respectively. The extracted products were 0.1% by weight and 0.2% by weight, respectively.

EXAMPLES 2 to 4

Milky white stable latexes were obtained in the same manner as in Example 1 except that urethane compounds of Reference Examples 2 to 4 were employed.

EXAMPLE 5

A mixture comprising 100 parts of the urethane compound of Reference Example 1, 30 parts of MMA, 15 parts of isobutylmethacrylate (iso-BMA) and 5 pars of N-butoxymethylacrylamide ($CH_2=CHCOONHC-H_2OC_4H_9$) (hereinafter referred to simply as N-BM), 5.0 parts of polyoxyethyleneoleyl ether (Emulgen 430, manufactured by Kao Corporation) and 1.5 parts of N,N-dimethylcoconutamine acetate (Farmine DMC. Acetate, manufactured by Kao Corporation) were added, and a latex was prepared in the same manner as in Example 1.

EXAMPLES 6 to 10

Latexes were prepared in the same manner as in Example 1 using the urethane compounds of Reference Examples 6 to 10 and various vinyl monomers, such as n-butyl methacrylate (n-BMA), glycidyl methacrylate (GMA) and hydorxyethyl methacrylate (HEMA).

EXAMPLE 11

To 160 parts of a mixture comprising 120 parts (solid content: 60 parts, MIBK: 60 parts) of the urethane compound of Reference Example 1 and 40 parts of isobutyl methacrylate (iBMA), 1.5 parts of polyoxyethylenenonylphenyl ether (Emulgen 920, manufactured by Kao Corporation) as an emulsifier and 5.0 parts of N,N-dimethylstearylamine acetate (Armine DM18D Acetate, manufactured by Lion Corporation) were added, and in the same manner as in Example 1, a milky white stable latex was obtained.

EXAMPLE 12

A milky white stable latex was obtained in the same manner as in Example 11 except that the urethane compound of Reference Example 2 was used.

EXAMPLE 13

To a mixture comprising 120 parts of the urethane compound of Reference Example 1, 35 parts of iBMA and 5 parts of N-butoxymethylacrylamide ($CH_2=CHCOONHCH_2OC_4H_9$, hereinafter referred to simply as N-BM), 5.0 parts of polyoxyethyleneoleyl ether (Emulgen 430, manufactured by Kao Corporation) as an emulsifier and 1.5 parts of N,N-dimethylcoconutamine acetate (Farmine DMC. Acetate, manufactured by Kao Corporation) were added, and in the same manner as in Example 1, a latex was obtained.

EXAMPLE 14

A milky white stable emulsion was obtained in the same manner as in Example 13 except that a mixture comprising 120 parts of the urethane compound of Reference Example 8, 35 parts of iBMA and 5 parts of hydroxyethyl methacrylate ($CH_2=CHCOOC_2H_4OH$, hereinafter referred to simply as HEMA), was used.

COMPARATIVE EXAMPLES 1 to 5

Milky white latexes were prepared in the same manner as in the Examples except that diisocyanates of Comparative Reference Examples 1 to 5 were used instead of the polyisocyanate.

COMPARATIVE EXAMPLE 6

To 100 parts of the urethane compound of Reference Example 1, 0.75 part of polyoxyethylenenonylphenyl ether (Emulgen 920, manufactured by Kao Corporation) as an emulsifier and 2.5 parts of N,N-dimethylstearylamine acetate (Armine DM18D Acetate, manufactured by Lion Corporation) were added, and then heated and dissolved at 50° C. While stirring the mixture by a homomixer, 150 parts of warm water of 50° C. was added. Further, the mixture was treated by a high pressure homogenizer. After this emulsification treatment, the solvent MIBK was distilled off under reduced pressure to obtain a milky white stable latex. By the observation by an electron microscope, it was confirmed that particles of nonspecified shape having a particle size of about 0.2 μm were formed.

COMPARATIVE EXAMPLE 7

An emulsion of urethane was prepared in the same manner as in Comparative Example 6 except that Emulgen 430 was used as the emulsifier instead of Emulgen 920 used in Comparative Example 6.

COMPARATIVE EXAMPLE 8

To 50 parts of MMA and 50 parts of MIBK, 0.75 part of polyoxyethylenenonylphenyl ether (Emulgen 920, manufactured by Kao Corporation) and 2.5 parts of N,N-dimethylstearylamine acetate (Armine DM18D Acetate, manufactured by Lion Corporation) were added, then heated and dissolved at 50° C. While stirring the mixture by a homogenizer, 150 parts of warm water of 50° C. was added. The mixture was further treated by a high pressure homogenizer. Into an ample for polymerization, 100 parts of this emulsion and 0.2 part of azoisobutyronitrile as a polymerization initiator were added and reacted in an autoclave at 60° C. for 20 hours. The conversion of the monomer was substantially 100%. After the polymerization reaction, the solvent MIBK was distilled off under reduced pressure to obtain a milky while stable latex.

COMPARATIVE EXAMPLE 9

An emulsion of urethane was prepared in the same manner as in Comparative Example 8 except that Emulgen 430 was used as an emulsifier instead of Emulgen 920 used in Comparative Example 8.

COMPARATIVE EXAMPLE 10

50 parts of the latex obtained in Comparative Example 6 and 50 parts of the latex of Comparative Example 8 were mixed to obtain a latex mixture of Comparative Example 10.

COMPARATIVE EXAMPLE 11

50 parts of the latex obtained in Comparative Example 7 and 50 parts of the latex of Comparative Example 9 were mixed to obtain a latex mixture of Comparative Example 11.

COMPARATIVE EXAMPLE 12

To 40 parts of polyfluoroalkylethylacrylate ($C_nF_{2n+1}CH_2CH_2OCOCH=CH_2$, a mixture of n=6, 8, 10, 12 and 14, n≈9) (hereinafter referred to simply as FA), 55 parts of MMA and 5 parts of N-butoxymethylacrylamide ($CH_2=CHCOONHCH_2OC_4H_9$), 1.5 parts of polyoxyethylenenonylphenyl ether (Emulgen 920, manufactured by Kao Corporation) and 5.0 parts of N,N-dimethylstearylamine acetate (Armine DM18D Acetate, manufactured by Lion Corporation) were added, and then 50 parts of acetone and 300 parts of water were added. The mixture was polymerized for 7 hours at 60° C. using an azo type water-soluble polymerization initiator (V-50, manufactured by Wako Junyaku K. K.) to obtain a latex.

COMPARATIVE EXAMPLES 13 and 14

Milky white latexes were prepared in the same manner as in Example 11 except that diisocyanates of Comparative Reference Examples 1 and 3 were used instead of the polyisocyanate.

COMPARATIVE EXAMPLE 15

To 45 parts of isoBMA, 5 parts of N-BM and 50 parts of MIBK, 0.75 parts of polyoxyethylenenonylphenyl ether (Emulgen-920, manufactured by Kao Corporation) as an emulsifier and 2.5 parts of N,N-dimethylstearylamine acetate (Farmine DM18D Acetate, manufactured by Lion Corporation) were added, and then heated and dissolved at 50° C. While stirring the mixture by a homomixer, 150 parts of warm water of 50° C. was added. Further, the mixture was treated by a high pressure homogenizer. Into an ampule for polymerization, 100 parts of this emulsion and 0.2 part of azoisobutyronitrile as a polymerization initiator were added and reacted in an autoclave at 60° C. for 20 hours. The conversion of the monomer was substantially 100%. After the polymerization reaction, the solvent MIBK was distilled off under reduced pressure to obtain a milky white stable latex. This latex was designated as Comparative Example 15.

COMPARATIVE EXAMPLE 16

An urethane emulsion was prepared in the same manner as in Comparative Example 15 except that Emulgen 430 was used as an emulsifier instead of Emulgen 920 used in Comparative Example 15.

COMPARATIVE EXAMPLE 17

60 parts of the latex obtained in Comparative Example and 40 parts of the latex of Comparative Example 15 were mixed to obtain a latex mixture of Comparative Example 17.

COMPARATIVE EXAMPLE 18

60 parts of the latex obtained in Comparative Example 7 and 40 parts of the latex of Comparative Example 16 were mixed to obtain a latex mixture of Comparative Example 18.

COMPARATIVE EXAMPLE 19

To 40 parts of polyfluoroakylethylacrylate ($C_nF_{2n+1}CH_2CH_2OCOCH=CH_2$, a mixture of n=$\approx$6, 8, 10, 12 and 14, n$\approx$9) (hereinafter referred to simply as FA), 55 parts of iBMA and 5 parts of N-butoxymethylacrylamide ($CH_2=CHCOONHCH_2OC_4H_9$), 1.5 parts of polyoxyethylenenonylphenyl ether (Emulgen 920, manufactured by Kao Corporation) and 5.0 parts of N,N-dimethylstearylamine acetate (Armine DM18D Acetate, manufactured by Lion Corporation) were added, and then 50 parts of acetone and 300 parts of water were added. The mixture was polymerized for 7 hours at 60° C. using an azo type water-soluble polymerization initiator (V-50, manufactured by Wako Junyaku K. K.) to obtain a latex.

6,6-Nylon loop carpets treated with the soilresisting agents of Examples 1 to 10 and Comparative Examples 1 to 12 obtained as described above (see Table 6), were subjected to the tests for the water and oil repellency and the dry soil resistance. The results are shown in Table 7. The treatments and the respective tests were conducted as follows.

1) Treatment

The treatment was conducted in such a manner that the soilresisting agents as identified in Tables 3 and 4 were adjusted with deionized water to concentrations of 0.6% by weight and 1.2% by weight, respectively, and then sprayed at a pick up of 25% by weight, followed by drying by a pin tender at 130° C. for 10 minutes.

2) Test for water and oil repellency

The water repellency (WR) was determined in such a manner that one drop of each of aqueous isopropanol solutions having different concentrations was put on a carpet, and the water repellency was represented by the number of the kit (Table 1) for an aqueous isopropanol solution having the highest concentration among those capable of maintaining the drop for 3 minutes.

The oil repellency (OR) was determined by placing a few drops (diameter: about 4 mm) of a test solution identified in the following Table 2 at two places on a carpet and evaluating the state of penetration upon expiration of 30 seconds (AATCC. TM118-1966).

3) Dry soil resistance

The test was conducted using black soil having a water content of 8% by weight by means of an accelerated tester simulating the actual stepping on with a shoe. After soiling, excess soil was removed by a vacuum cleaner, and the reflectance was measured to evaluate the dry soil resistance.

The dry soil resistance (DSR) was calculated by the following equation:

$$DSR = \frac{Rs - R}{R0} \times 100$$

Rs=Reflectance of the treated cloth after the soiling test (%)
R=Reflectance of the non-treated cloth after the soiling test (%)
R0=Reflectance before the soiling test (%)

Treatment of leathers and evaluation thereof were conducted with respect to chrome-tanned cow hides treated with the water and oil repellents for leathers according to the present invention (Examples 11 to 20) and with Comparative Examples 13 to 24. The results are shown in Table 8. The treatment and the respective tests were conducted as follows.

1) Treatment

The treatment was conducted in such a manner that the water and oil repellent for leather as identified in Table 6 was introduced into a dram and a chrome-tanned cow hide was immersed in this dram and treated at 50° C. for 60 minutes. Then, it was washed with water, dried and then crumpled by a usual method. Then, it was subjected to drying on a net at 70° C. for 40 minutes, and then subjected to tests. The concentration of the water and oil repellent was adjusted with city water of pH 6 to a level of 4%.

2) Test for water and oil repellency and dynamic water resistance

The water repellency was determined in such a manner that the treated leather was formed into a bag, and water was put into the bag. Upon expiration of 48 hours, the state of penetration of water was visually observed.

The oil repellency was determined in the same manner as in the case of carpets by placing a few drops (diameter: about 4 mm) of a test solution identified in Table 2 at two places on a cow hide and evaluating the state of penetration upon expiration of 30 seconds (AATCC TM118-1966).

The dynamic water resistance was determined by measuring the time until water penetrated by means of a dynamic tester manufactured by Kabushiki Kaisha Toyoseiki Seisakusho. The number of times of a bending operation was 60 times per minute.

TABLE 1

| (Water repellency kit) | | | |
|---|---|---|---|
| Water repellency | IPA/Water (wt %/wt %) | Water repellency | IPA/Water (wt %/wt %) |
| 11 | 100/0 | 4 | 30/70 |
| 10 | 90/10 | 3 | 20/80 |
| 9 | 80/20 | 2 | 10/90 |
| 8 | 70/30 | 1 | 0/100 |
| 7 | 60/40 | 0 | Lower than 1 |
| 6 | 50/50 | | |
| 5 | 40/60 | | |

TABLE 2

| Oil repellency kit (AATCC TM118-1966) | | |
|---|---|---|
| Oil repellency | Test solution | Surface tension dyn/cm at 25° C. |
| 8 | n-heptane | 20.0 |
| 7 | n-octane | 21.8 |
| 6 | n-decane | 23.5 |
| 5 | n-dodecane | 25.0 |
| 4 | n-tetradecane | 26.7 |
| 3 | n-hexadecane | 27.3 |
| 2 | n-hexadecane/Nujol 35/65 (wt %/wt %) | 29.6 |
| 1 | Nujol | 31.2 |
| 0 | Lower than 1 | |

The results of Examples 1 to 10 and Comparative Examples 1 to 12 are shown in Table 7.

The results of Examples 11 to 20 and Comparative Examples 13 to 24 are shown in Table 8.

TABLE 3

| Reference Example No. | Polyisocyanate | Parts | Solvent | Parts | Polyfluoroalkyl group-containing hydroxy compound | parts | (Meth)acrylayl group- or allyl group-containing hydroxy compound | parts | Reaction temp. (°C.) |
|---|---|---|---|---|---|---|---|---|---|
| 1 | OCN(CH$_2$)$_6$NHC(O)N(CH$_2$)$_6$NCO / OCN(CH$_2$)$_6$NHC(O) | 100.0 | Methyl isobutyl ketone | 405.5 | R$_f$CH$_2$CH$_2$OH | 213.8 | CH$_2$=C(CH$_3$)CO(CH$_2$CH$_2$O)$_n$H, $n \approx 8$, (C=O) | 91.7 | 60 |
| 2 | OCN(CH$_2$)$_6$–[isocyanurate ring with (CH$_2$)$_6$NCO substituents] | 100.0 | Methyl ethyl ketone | 383.5 | R$_f$CH$_2$CH$_2$OH | 182.5 | CH$_2$=CH–CO(CH$_2$CH$_2$O)$_n$H, $n \approx 8$, (C=O) | 101.8 | 60 |
| 3 | CH$_2$OCONH(CH$_2$)$_6$NCO / CH$_3$CH$_2$C–CH$_2$OCONH(CH$_2$)$_6$NCO / CH$_2$OCONH(CH$_2$)$_6$NCO | 100.0 | Methyl isobutyl ketone | 341.5 | C$_8$F$_{17}$SO$_2$N(CH$_3$)(CH$_2$CH$_2$OH) | 165.9 | CH$_2$=C(CH$_3$)CO(CH$_2$CH$_2$O)$_n$H, $n \approx 8$, (C=O) | 75.6 | 70 |
| 4 | CH$_2$OCONH–Ar(CH$_3$)(NCO) / CH$_3$CH$_2$CCH$_2$OCONH–Ar(CH$_3$)(NCO) / CH$_2$OCONH–Ar(CH$_3$)(NCO) | 100.0 | Ethyl acetate | 270.1 | C$_8$F$_{17}$SO$_2$N(C$_2$H$_5$)(CH$_2$CH$_2$OH) | 139.3 | CH$_2$=C(CH$_3$)COCH$_2$CHCH$_3$–OH (C=O) | 30.8 | 60 |

TABLE 3-continued

| Reference Example No. | Polyisocyanate | Parts | Solvent | Parts | Polyfluoroalkyl group-containing hydroxy compound | parts | (Meth)acrylayl group-or allyl group-containing hydroxy compound | parts | Reaction temp. (°C.) |
|---|---|---|---|---|---|---|---|---|---|
| 5 | (triazine-trione ring with three substituted tolyl-NCO groups) | 100.0 | Butyl acetate | 305.5 | C₈F₁₇SO₂N(C₂H₅)CH₂CH₂OH | 168.1 | CH₂=CHCOC₃H₇OH (with C=O) | 37.4 | 70 |

TABLE 4

| Reference Example No. | Polyisocyanate | | Parts | Solvent | Parts | Polyfluoroalkyl group-containing hydroxy compound | parts | (Meth)acrylayl group- or allyl group-containing hydroxy compound | parts | Reaction temp. (°C.) |
|---|---|---|---|---|---|---|---|---|---|---|
| 6 | 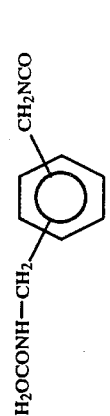 | | 100.0 | Methyl isobutyl ketone | 324.2 | Rf CH$_2$CH$_2$OH<br>$\|$<br>OH<br>CH$_3$ | 144.1 | CH$_3$<br>$\|$<br>CH$_2$=C<br>$\quad$\\<br>$\quad$CO(CH$_2$CH$_2$O)$_n$H<br>$\quad$$\|$<br>$\quad$O<br>$n \approx 8$ | 80.1 | 80 |
| 7 |  | | 100.0 | Methyl isobutyl ketone | 309.9 | CH$_3$<br>$\|$<br>Rf CONCH$_2$CH$_2$OH | 175.0 | CH$_3$<br>$\|$<br>CH$_2$=C<br>$\quad$\\<br>$\quad$COCH$_2$CH$_2$OH<br>$\quad$$\|$<br>$\quad$O | 34.9 | 60 |

TABLE 4-continued

| Reference Example No. | Polyisocyanate | | Parts | Solvent | Parts | Polyfluoroalkyl group-containing hydroxy compound | parts | (Meth)acrylayl group-or allyl group-containing hydroxy compound | parts | Reaction temp. (°C.) |
|---|---|---|---|---|---|---|---|---|---|---|
| 8 | 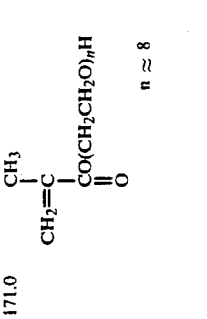 | | 100.0 | Ethyl acetate | 368.7 | Rf CH$_2$CH$_2$OH | 171.0 | CH$_2$=C(CH$_3$)CO(CH$_2$CH$_2$O)$_n$H, n ≈ 8 | 97.7 | 60 |
| 9 | 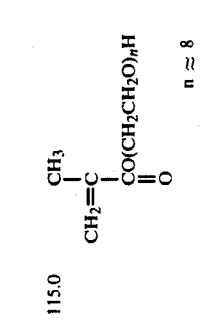 | | 100.0 | Methyl ethyl acetate | 280.7 | Rf CH$_2$CH$_2$OH | 115.0 | CH$_2$=C(CH$_3$)CO(CH$_2$CH$_2$O)$_n$H, n ≈ 8 | 65.7 | 60 |
| 10 | Sumidule N 3200, manufactured by Sumitomo Bayern Company (NCO % = 22.8%) | | 100.0 | Methyl isobutyl ketone | 361.5 | Rf CH$_2$CH$_2$OH | 166.4 | CH$_2$=C(CH$_3$)CO(CH$_2$CH$_2$O)$_n$H, n ≈ 8 | 95.1 | 60 |

TABLE 5

| Comparative Reference Example No. | Polyisocyanate | Parts | Solvent | Parts | Polyfluoroalkyl group-containing hydroxy compound | parts | (Meth)acrylayl group-or allyl group-containing hydroxy compound | parts | Reaction temp. (°C.) |
|---|---|---|---|---|---|---|---|---|---|
| 1 | 2,4-tolylene diisocyanate (CH$_3$-C$_6$H$_3$(NCO)$_2$) | 100.0 | Methyl isobutyl ketone | 645.4 | RfCH$_2$CH$_2$OH | 293.7 | CH$_2$=C(CH$_3$)CO(CH$_2$CH$_2$)$_n$H, O, n ≈ 8 | 251.7 | 60 |
| 2 | trimethyl-cyclohexane with CH$_2$NCO and NCO groups | 100.0 | Methyl ethyl ketone | 548.2 | C$_8$F$_{17}$SO$_2$N(C$_2$H$_5$)CH$_2$CH$_2$OH | 250.9 | CH$_2$=CH-CO(CH$_2$CH$_2$OH)$_n$H (CH$_3$), O, n ≈ 8 | 197.3 | 60 |
| 3 | OCN(CH$_2$)$_6$NCO | 100.0 | Ethyl acetate | 664.9 | RfCH$_2$CH$_2$OH | 304.2 | CH$_2$=C(CH$_3$)CO(CH$_2$CH$_2$O)$_n$H, O, n ≈ 8 | 260.7 | 70 |
| 4 | m-phenylene diisocyanate (OCN-C$_6$H$_4$-NCO) | 100.0 | Methyl ethyl acetate | 480.3 | C$_8$F$_{17}$SO$_2$N(C$_3$H$_7$)CH$_2$CH$_2$OH | 311.2 | CH$_2$=CHCOCH$_2$CHCH$_3$, O, OH | 69.1 | 60 |
| 5 | 2,4-tolylene diisocyanate (CH$_3$-C$_6$H$_3$(NCO)$_2$) | 100.0 | Methyl isobutyl ketone | 359.0 | RfCH$_2$CH$_2$OH | 146.9 | CH$_2$=CHCOC$_3$H$_7$OH, O | 112.1 | 70 |

TABLE 6

| | Urethane compound | Parts | Vinyl monomer | parts | Emulsifier | Parts |
|---|---|---|---|---|---|---|
| Example 1 | Reference Example 1 | 100 | MMA | 50 | Emulgen 920 | 1.5 |
| | | | | | Armine DM18D/AcOH | 5.0 |
| Example 2 | Reference Example 2 | 100 | MMA | 50 | Emulgen 920 | 1.5 |
| | | | | | Armine DM18D/AcOH | 5.0 |
| Example 3 | Reference Example 3 | 100 | MMA | 50 | Emulgen 920 | 1.5 |
| | | | | | Armine DM18D/AcOH | 5.0 |
| Example 4 | Reference Example 4 | 100 | MMA | 50 | Emulgen 920 | 1.5 |
| | | | | | Armine DM18D/AcOH | 5.0 |
| Example 5 | Reference Example 5 | 100 | MMA/isoBMA/N-BM 30/10/10 | 50 | Emulgen 920 | 1.5 |
| | | | | | Armine DM18D/AcOH | 5.0 |
| Example 6 | Reference Example 6 | 100 | MMA | 70 | Emulgen 430 | 5.0 |
| | | | | | Armine DM18D/AcOH | 1.5 |
| Example 7 | Reference Example 7 | 100 | MMA/isoBMA/GMA 50/10/10 | 70 | Emulgen 920 | 1.5 |
| | | | | | Armine DM18D/AcOH | 5.0 |
| Example 8 | Reference Example 8 | 100 | FA/MMA/GMA 50/20/5 | 30 | Emulgen 920 | 1.5 |
| | | | | | Armine DM18D/AcOH | 5.0 |
| Example 9 | Reference Example 9 | 100 | MMA/isoBMA/N-BM 20/5/5 | 30 | Emulgen 920 | 1.5 |
| | | | | | Armine DM18D/AcOH | 5.0 |
| Example 10 | Reference Example 10 | 100 | MMA/isoBMA/HEMA 20/5/5 | 30 | Emulgen 920 | 1.5 |
| | | | | | Armine DM18D/AcOH | 5.0 |
| Comparative Example 1 | Comparative Reference Example 1 | 100 | MMA | 50 | Emulgen 430 | 1.5 |
| | | | | | Farmine DMC/AcOH | 5.0 |
| Comparative Example 2 | Comparative Reference Example 2 | 100 | MMA | 50 | Emulgen 920 | 1.5 |
| | | | | | Farmine DMC/AcOH | 5.0 |
| Comparative Example 3 | Comparative Reference Example 3 | 100 | MMA | 50 | Emulgen 920 | 1.5 |
| | | | | | Armine DM18D/AcOH | 5.0 |
| Comparative Example 4 | Comparative Reference Example 4 | 100 | MMA | 50 | Emulgen 920 | 1.5 |
| | | | | | Armine DM18D/AcOH | 5.0 |
| Comparative Example 5 | Comparative Reference Example 5 | 100 | MMA | 50 | Emulgen 920 | 1.5 |
| | | | | | Armine DM18D/AcOH | 5.0 |
| Comparative Example 6 | Reference Example 1 | 100 | Nil | 0 | Emulgen 920 | 0.75 |
| | | | | | Armine DM18D/AcOH | 2.50 |
| Comparative Example 7 | Reference Example 1 | 100 | Nil | 0 | Emulgen 430 | 0.75 |
| | | | | | Farmine DCM/AcOH | 2.50 |
| Comparative | Nil | 0 | MMA | 50 | Emulgen 920 | 0.75 |

TABLE 6-continued

| | Urethane compound | Parts | Vinyl monomer | parts | Emulsifier | Parts |
|---|---|---|---|---|---|---|
| Example 8 | | | | | Armine DM18D/AcOH | 2.50 |
| Comparative Example 9 | Nil | 0 | MMA | 50 | Emulgen 430 | 0.75 |
| | | | | | Farmine DMC/AcOH | 2.50 |
| Comparative Example 10 | Comparative Example 6 (50) + Comparative Example 8 (50) | | | | | |
| Comparative Example 11 | Comparative Example 7 (50) + Comparative Example 9 (50) | | | | | |
| Comparative Example 12 | Nil | 0 | FA/MMA/N-BM 40/55/5 | 100 | Emulgen 920 | 1.5 |
| | | | | | Armine DM18D/AcOH | 5.0 |
| Example 11 | Reference Example 1 | 100 | isoBMA | 40 | Emulgen 920 | 1.5 |
| | | | | | Armine DM18/AcOH | 5.0 |
| Example 12 | Reference Example 2 | 100 | isoBMA | 40 | Emulgen 920 | 1.5 |
| | | | | | Armine DM18/AcOH | 5.0 |
| Example 13 | Reference Example 1 | 100 | isoBMA/N-BM 35/5 | 40 | Emulgen 920 | 1.5 |
| | | | | | Armine DM18D/AcOH | 5.0 |
| Example 14 | Reference Example 8 | 100 | isoBMA/HEMA 35/5 | 40 | Emulgen 920 | 1.5 |
| | | | | | Armine DM18D/AcOH | 5.0 |
| Comparative Example 13 | Comparative Reference Example 1 | 100 | isoBMA/N-BM 35/5 | 40 | Emulgen 920 | 5.0 |
| | | | | | Armine DM18D/AcOH | 1.5 |
| Comparative Example 14 | Comparative Reference Example 3 | 100 | isoBMA-HEA 35/5 | 40 | Emulgen 920 | 1.5 |
| | | | | | Armine DM18D/AcOH | 5.0 |
| Comparative Example 15 | Nil | 100 | isoBMA/N-BM 90/10 | 100 | Emulgen 920 | 1.5 |
| | | | | | Armine DM18/AcOH | 5.0 |
| Comparative Example 16 | Nil | 0 | isoBMA/N-BM 90/10 | 100 | Emulgen 430 | 1.5 |
| | | | | | Armine DM18D/AcOH | 5.0 |
| Comparative Example 17 | Comparative Example 6 + Comparative Example 15 | | | | | |
| Comparative Example 18 | Comparative Example 7 + Comparative Example 16 | | | | | |
| Comparative Example 19 | FA/iBMA/N-BM = 50/5/5 | | | | Emulgen 920 Armine DM18D/AcOH | |

TABLE 7

| | | 4% Treatment | | | 8% Treatment | | | | |
|---|---|---|---|---|---|---|---|---|---|
| | | OR | WR | DSR | OR | WR | DSR | Stability | Particle form |
| Examples | 1 | 5 | 5 | 16 | 5 | 6 | 16 | Good | Spherical |
| | 2 | 5 | 4 | 16 | 5 | 5 | 16 | Good | Spherical |
| | 3 | 5 | 5 | 16 | 5 | 6 | 16 | Good | Spherical |
| | 4 | 5 | 5 | 16 | 5 | 6 | 16 | Good | Spherical |
| | 5 | 5 | 5 | 16 | 5 | 6 | 15 | Good | Spherical |
| | 6 | 4 | 5 | 15 | 5 | 6 | 16 | Good | Spherical |
| | 7 | 4 | 5 | 16 | 5 | 6 | 16 | Good | Spherical |
| | 8 | 5 | 5 | 14 | 5 | 6 | 13 | Good | Spherical |
| | 9 | 5 | 5 | 14 | 5 | 6 | 13 | Good | Spherical |
| | 10 | 5 | 5 | 14 | 5 | 6 | 13 | Good | Spherical |
| Comparative Examples | 1 | 3 | 4 | 15 | 3 | 4 | 15 | Good | Spherical |
| | 2 | 2 | 4 | 10 | 2 | 4 | 10 | Good | Spherical |
| | 3 | 2 | 3 | 10 | 2 | 3 | 10 | Precipitate | Spherical |
| | 4 | 3 | 4 | 12 | 3 | 4 | 12 | Good | Spherical |
| | 5 | 3 | 4 | 15 | 3 | 4 | 15 | Good | Spherical |
| | 6 | 5 | 5 | 5 | 5 | 6 | 3 | Good | Non-specific |
| | 7 | 5 | 5 | 5 | 5 | 6 | 3 | Good | Non-specific |
| | 8 | 0 | 1 | 15 | 0 | 1 | 15 | Good | Spherical |
| | 9 | 3 | 1 | 15 | 3 | 1 | 15 | Good | Spherical |
| | 10 | 5 | 5 | 15 | 5 | 5 | 15 | Precipitate | Spherical + non-specific |
| | 11 | 5 | 5 | 16 | 5 | 4 | 16 | Precipitate | Spherical + non-specific |
| | 12 | 2 | 2 | 2 | 2 | 2 | 2 | Good | Spherical |

TABLE 8

| | WR | OR | Dynamic WR | Stability | Particle form |
|---|---|---|---|---|---|
| Example 11 | No penetration of water | 5 | at least 30 min. | Good | Spherical |
| Example 12 | No penetration of water | 4 | at least 30 min. | Good | Spherical |
| Example 13 | No penetration of water | 6 | at least 30 min. | Good | Spherical |
| Example 14 | No penetration of water | 4 | at least 30 min. | Good | Spherical |
| Comparative Example 13 | 24 hrs. later | 4 | less than 15 min. | Good | Spherical |
| Comparative Example 14 | 12 hrs. later | 5 | less than 10 min. | Precipitate | Non-spherical |
| Comparative Example 15 | 12 hrs. later | 0 | less than 5 min. | Good | Spherical |
| Comparative | 12 hrs. later | 0 | less than | Good | Spherical |

TABLE 8-continued

| | WR | OR | Dynamic WR | Stability | Particle form |
|---|---|---|---|---|---|
| Example 16 | | | 5 min. | | |
| Comparative Example 17 | 18 hrs. later | 4 | less than 30 min. | Precipitate | Non-spherical |
| Comparative Example 18 | 18 hrs. later | 4 | less than 30 min. | Precipitate | Non-spherical |
| Comparative Example 19 | 6 hrs. later | 6 | less than 2 min. | Good | Spherical |

The soilresisting agent of the present invention is capable of imparting excellent water and oil repellency and dry soil resistance simultaneously to fiber products, particularly to carpets, as compared with conventional soilresisting agents. Further, it provides excellent soilresisting effects with a smaller amount and with a smaller amount of fluorine. Since its particles are uniform and fine, it is excellent in the film forming properties, whereby adequate effects can be provided by heat treatment for a short period of time. Further, by eliminating the emulsion of urethane alone which causes a substantial reduction of the stability and by introducing this urethane moiety via an organic linkage into an emulsion of a stable acryloyl polymer, the stability of the latex can be increased. Therefore, it is possible to remarkably reduce such conventional troubles that a nozzle is clogged during spraying to lower the operation efficiency, and scam is formed during spraying to cause irregularities in treatment. Further, as a result of the improvement in the stability, various other treating agents may be used in combination, which used to be hardly combined.

We claim:

1. A soilresisting agent containing, as an effective component, a copolymer of (I) a fluorine-containing urethane compound containing a (meth)acryloyl group or an allyl group, and a polyfluoroalkyl group, obtained by reacting (a) a polyfunctional isocyanate having at least trifunctionality, (b) a hydroxy compound containing a (meth)acryloyl group or an allyl group, and (c) a hydroxy compound having a polyfluoroalkyl group, and (II) a copolymerizable compound other than said fluorine-containing urethane compound.

2. The soilresisting agent according to claim 1, wherein the fluorine-containing urethane compound is obtained by reacting the hydroxy compound containing a polyfluoroalkyl group and a polyfunctional isocyanate compound, followed by reacting the hydroxy compound containing a (meth)acryloyl group or an allyl group.

3. The soilresisting agent according to claim 1, wherein the copolymerizable compound other than the fluorine-containing urethane compound contains a (meth)acryloyl group or an allyl group.

4. The soilresisting agent according to claim 1, wherein the reaction molar ratio of the polyfunctional isocyanate compound, the hydroxy compound containing a (meth)acryloyl group or an allyl group and the hydroxy compound containing a polyfluoroalkyl group, is such that the molar ratio of the hydroxy compound containing a (meth)acryloyl group or an allyl group and the hydroxy compound containing a polyfluoroalkyl group to 3 mol of the isocyanate group, is from 1:2 to 2.8:0.2.

5. The soilresisting agent according to claim 1, wherein the fluorine content in the copolymer is from 2 to 50% by weight.

6. An aqueous dispersion-type soilresisting agent obtained by dissolving a fluorine-containing urethane compound containing a (meth)acryloyl group or an allyl group, and a polyfluoroalkyl group, and a copolymerizable compound other than this fluorine-containing urethane compound, in a water-insoluble organic solvent, then emulsifying and dispersing the solution in water, followed by polymerization and then distilling the solvent off.

7. The aqueous dispersion-type soilresisting agent according to claim 6, wherein the fluorine-containing urethane compound is obtained by reacting a polyfunctional isocyanate having at least trifunctionality, a hydroxy compound containing a (meth)acryloyl group or an allyl group, and a hydroxy compound having a polyfluoroalkyl group.

8. The aqueous dispersion-type soilresisting agent according to claim 6, wherein the copolymerizable compound other than the fluorine-containing urethane compound contains a (meth)acryloyl group or an allyl group.

9. The aqueous dispersion-type soilresisting agent according to claim 6, wherein the reaction molar ratio of the polyfunctional isocyanate compound, the hydroxy compound containing a (meth)acryloyl group or an allyl group and the hydroxy compound containing a polyfluoroalkyl group, is such that the molar ratio of the hydroxy compound containing a (meth)acryloyl group or an allyl group and the hydroxy compound containing a polyfluoroalkyl group to 3 mol of the isocyanate group is from 1:2 to 2.8:0.2.

10. The aqueous dispersion-type soilresisting agent according to claim 6, wherein the fluorine content in the copolymer is from 2 to 50% by weight.

* * * * *